United States Patent [19]

Watanabe

[11] Patent Number: 5,705,004
[45] Date of Patent: Jan. 6, 1998

[54] PROCESS FOR PRODUCING MAGNETIC DISK CARTRIDGE

[75] Inventor: Seiichi Watanabe, Kanagawa-ken, Japan

[73] Assignees: Fuji Photo Film Co., Ltd., Tokyo, Japan; Iomega Corporation, Roy, Utah

[21] Appl. No.: 699,634

[22] Filed: Aug. 19, 1996

[51] Int. Cl.$^6$ ............................................. B32B 31/00
[52] U.S. Cl. .................. 156/83; 156/85; 156/256; 156/290
[58] Field of Search .................. 156/83, 85, 256, 156/290

[56] References Cited

U.S. PATENT DOCUMENTS

| | | | |
|---|---|---|---|
| 3,443,006 | 5/1969 | Simons et al. | 156/83 |
| 3,615,966 | 10/1971 | Eneby | 156/83 |
| 4,066,488 | 1/1978 | Lehr | 156/83 |
| 4,639,390 | 1/1987 | Shoji | 428/195 |
| 4,704,170 | 11/1987 | Priaroggia | 156/83 |
| 5,085,723 | 2/1992 | Nakaki et al. | 156/250 |
| 5,436,032 | 7/1995 | Matsui et al. | 427/365 |

*Primary Examiner*—David A. Simmons
*Assistant Examiner*—Linda L. Gray
*Attorney, Agent, or Firm*—Sughrue, Mion, Zinn, Macpeak & Seas, PLLC

[57] ABSTRACT

A process for producing a magnetic disk cartridge comprises the steps of moistening liners to be attached to inner surfaces of a cassette shell to face a magnetic disk rotatably encased in the cassette shell, thereby expanding the liners, and attaching the moistened and expanded liners to the inner surfaces of the cassette shell. Since the liners shrink upon drying, they remain taut irrespective of changes in the use environment.

3 Claims, 5 Drawing Sheets

F I G. 1
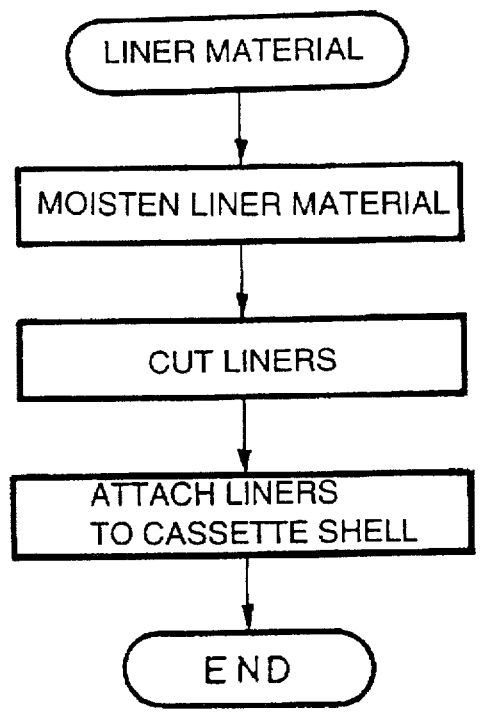
F I G. 2
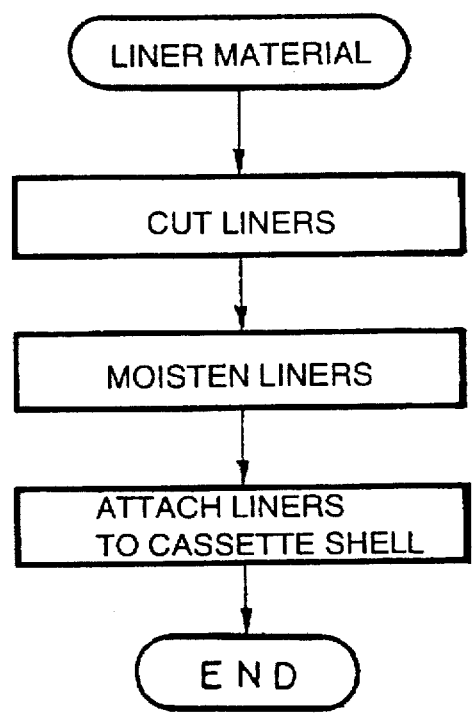

F I G. 5
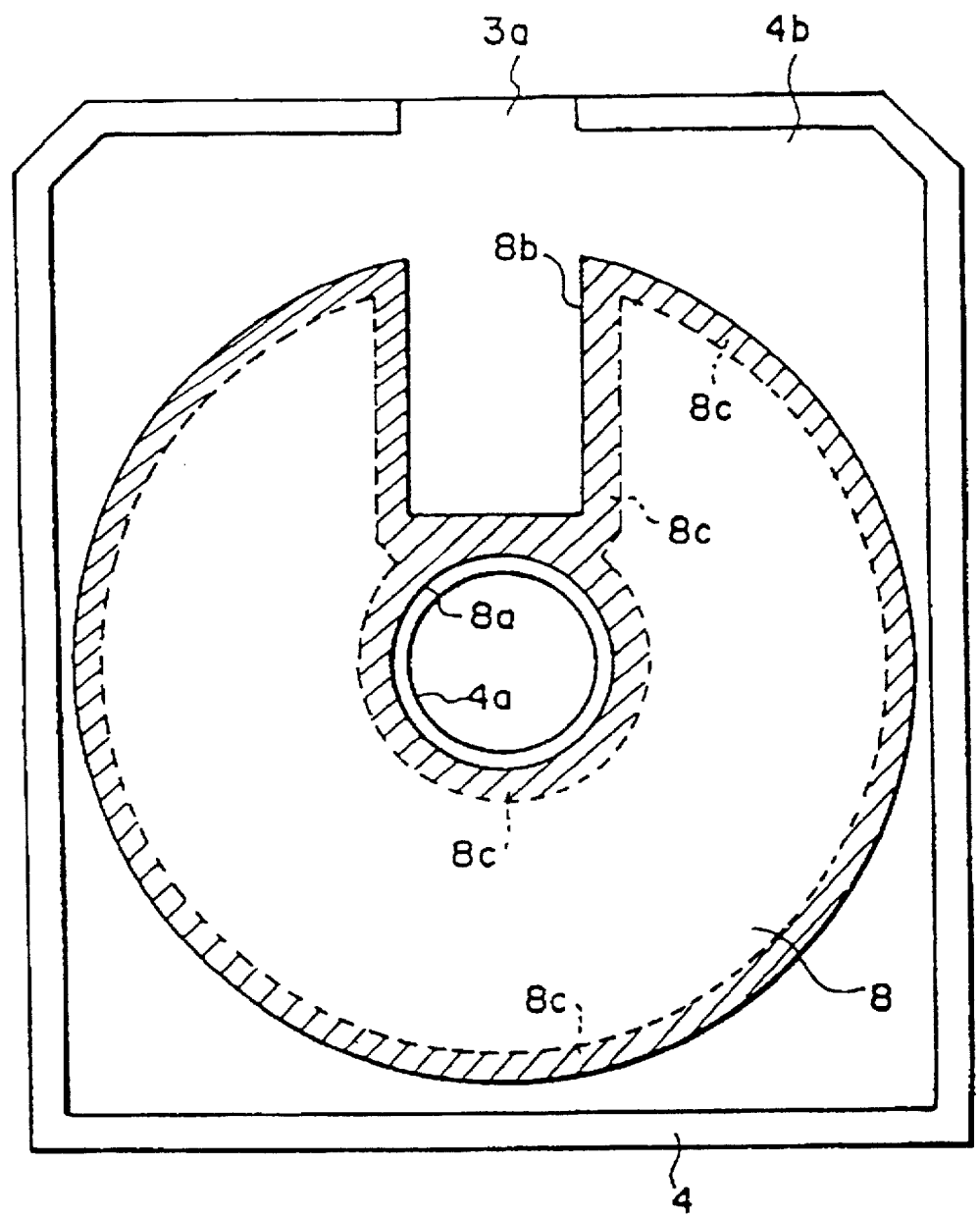

F I G. 6
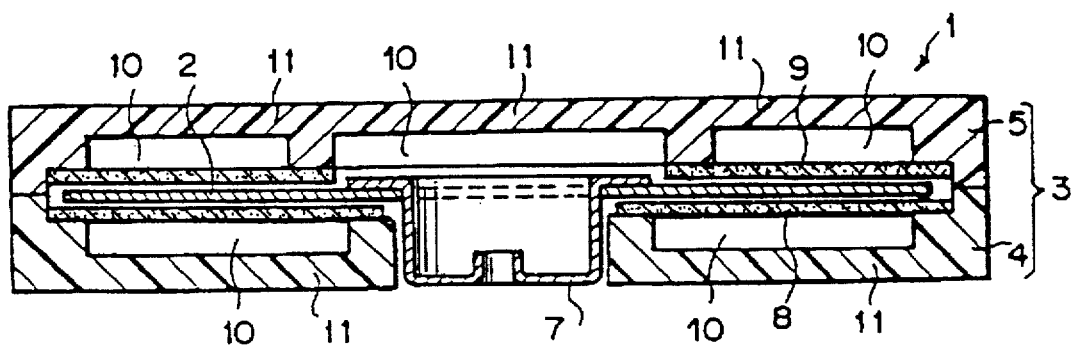

PROCESS FOR PRODUCING MAGNETIC DISK CARTRIDGE

BACKGROUND OF THE INVENTION

Field of the Invention

The present invention relates to a process for producing a magnetic disk cartridge, more particularly to an improved process for producing a magnetic disk cartridge having a rotatable magnetic disk encased in a cassette shell having liners attached to its inner surfaces.

A magnetic disk cartridge comprises a magnetic disk for magnetically recording analog and/or digital signals rotatably encased in a thin cassette shell. The cassette shell is formed in the shape of a flat prism with a generally square top surface slightly larger than the magnetic disk, a bottom surface having an opening through which a center core supporting the center of the magnetic disk is exposed and narrow side surfaces extending between the outer peripheral edges of the top and bottom surfaces. The magnetic disk cartridge is provided with a magnetic head access opening for insertion/withdrawal of magnetic heads used for magnetic recording and reproducing so as to enable the magnetic heads to be brought into contact with, or close to, the opposite surfaces of the magnetic disk from the exterior. The magnetic head access opening is equipped with a shutter for preventing invasion of dust and the like when the magnetic disk cartridge is not in use.

Liners made of nonwoven fabric or the like are attached to the inner surfaces of the cassette shell opposite the main surfaces of the magnetic disk for protecting the surfaces of the magnetic disk from scratching as well as for wiping off dust and the like adhering thereto.

The space inside the cassette shell of the conventional magnetic disk cartridge is fairly large in the direction of magnetic disk thickness and the liners are accommodated in the spaces remaining above and below magnetic disk. Each liner is urged away from the inner surface of the cassette shell and maintained in contact with the corresponding surface of the magnetic disk by a weak plate spring called a lifter. In most magnetic disk cartridges, therefore, the liners are not attached to the inner surfaces of the cassette shell over their entire surfaces but are attached only at the peripheral portions, for example, by ultrasonic welding or the like.

In recent years, new high-density recording methods have led to the development of a magnetic disk cartridge with 50 times the capacity of the widely used conventional magnetic disk cartridge (3.5-inch floppy disk). In order to increase the recording density and the data transfer rate of such a high-capacity magnetic disk cartridge, the magnetic disk is rotated at a much faster speed than the conventional one and the magnetic heads used for recording and reproducing are required to be positioned with very high precision.

Contact of the liners for removing dust adhering to the magnetic disk with broad areas of the disk has been found to be undesirable in view of the need to rotate the magnetic disk at high speed.

The nonwoven fabric liners are generally hygroscopic and therefore contract and expand with changes in the surrounding environment, particularly with changes in humidity. When the magnetic disk cartridge is left in a high-humidity environment, the liners inside tend to sag and are liable to make excessive contact with the magnetic disk.

Unnecessary contact of the sagging liners with the magnetic disk when it is rotating at high speed prevents stable high-speed rotation of the magnetic disk. The heat and static electricity generated at the contact regions also causes problems.

Sagging of the liners is therefore preferably prevented by attaching their entire surfaces to the inner surfaces of the cassette shell with and adhesive or the like. However, this is disadvantageous from the points of production speed, cost etc.

SUMMARY OF THE INVENTION

This invention was accomplished in light of the foregoing and has as its object to provide a process for producing a magnetic disk cartridge which enables prevention of liner sagging with environmental changes without attaching the liners to the inner surfaces of the cassette shell over their entire surfaces.

For achieving this object, this invention provides a process for producing a magnetic disk cartridge comprising the steps of moistening at least one liner to be attached to an inner surface of a cassette shell to face a magnetic disk rotatably encased in the cassette shell, thereby expanding the liner, and attaching the moistened and expanded liner to the inner surface of the cassette shell.

As shown in FIG. 1, in one aspect of the invention the process comprises the steps of moistening liner material to expand the material, cutting a liner of prescribed size from the material and attaching the moistened and expanded liner to the inner surface of the cassette shell. As shown in FIG. 2, in another aspect of the invention the process comprises the steps of cutting a liner from liner material, moistening the liner to expand it to a prescribed size and attaching the moistened and expanded liner to the inner surface of the cassette shell.

BRIEF DESCRIPTION OF THE DRAWINGS

FIG. 1 is a flow chart showing a process for producing a magnetic disk cartridge which is an embodiment of the invention.

FIG. 2 is a flow chart showing a process for producing a magnetic disk cartridge which is another embodiment of the invention.

FIG. 5 is a plan view of a cassette shell half with an attached liner.

FIG. 6 is a sectional view similar to that of FIG. 4 showing an essential part of another magnetic disk cartridge to which the invention is applied.

DESCRIPTION OF THE PREFERRED EMBODIMENTS

Embodiments of the present invention will hereinbelow be described with reference to the accompanying drawings.

Figure 3:
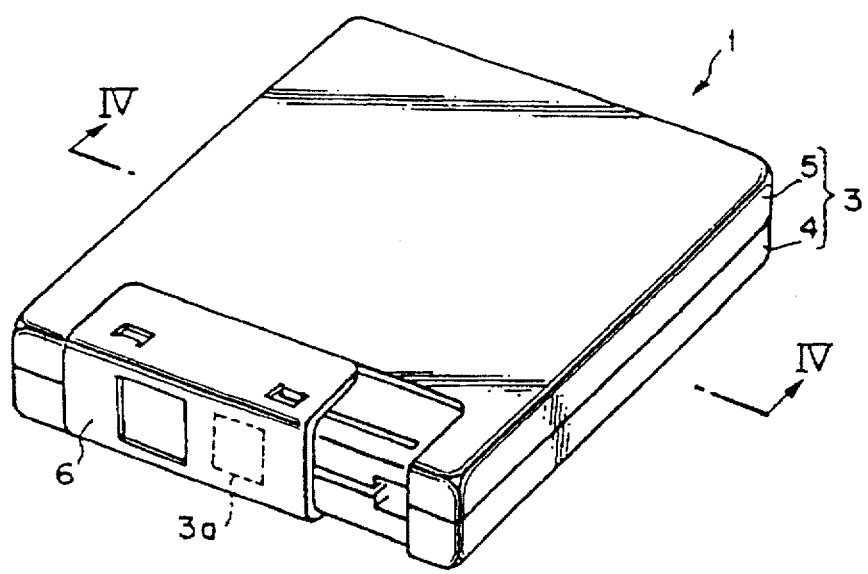
FIG. 3 is a perspective view showing an example of a magnetic disk cartridge to which the invention is applied.
Figure 4:
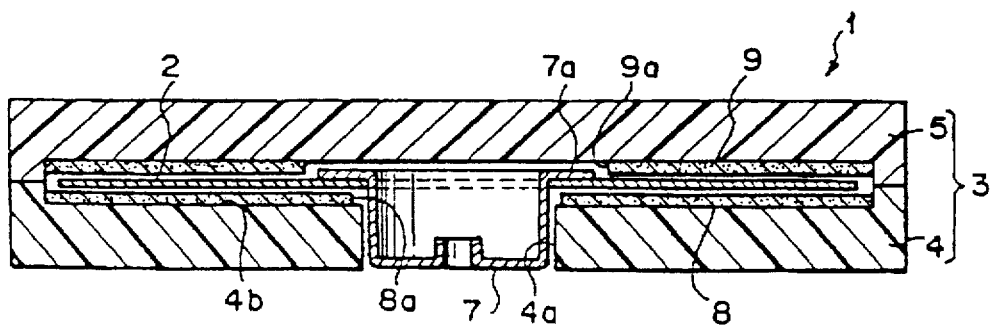
FIG. 4 is a sectional view taken along line IV—IV in FIG. 3.

FIG. 3 is a perspective view showing an example of a magnetic disk cartridge to which the invention is applied, FIG. 4 is a sectional view taken along line IV—IV in FIG. 3, and FIG. 5 is a plan view showing a cassette shell half of the magnetic disk cartridge with an attached liner.

The magnetic disk cartridge, designated by reference numeral 1, has a cassette shell 3 encasing a rotatable magnetic disk 2. The cassette shell 3 is formed of a pair of lower (first) and upper (second) cassette shell halves 4, 5 which are both made of molded plastic. A magnetic head access opening 3a is formed in one side surface of the cassette shell 3 for enabling magnetic reproducing and recording heads to be brought close to the opposite surfaces of the magnetic disk 2 from the exterior, and a sectionally u-shaped shutter member 6 is provided to be slidable along the cassette shell for opening and closing the magnetic head access opening 3a. The shutter member 6 is biased toward the closed position by a spring (not shown). FIG. 3 shows the magnetic head access opening 3a closed by the shutter member 6 (in the closed position).

The first cassette shell half 4, located on the lower side in the figures, is formed with a circular hole 4a through which a center core 7 supporting the center of the magnetic disk 2 is exposed. A doughnut-shaped liner 8 made of nonwoven fabric and having a circular hole 8a of slightly larger diameter than the circular hole 4a is attached to the inner surface 4b of the first cassette shell half 4. As shown in FIG. 5, the liner 8 is formed with a notch 8b extending radially inward from the side of the magnetic head access opening 3a. The notch 8b can either stop short of the circular hole 8a (as shown in FIG. 5) or connect therewith. The liner 8 is attached to the inner surface 4b of the first cassette shell half 4 by ultrasonic welding at its outer peripheral portion, inner peripheral portion and the edges of the notch 8b for enabling insertion of a magnetic head. The attachment regions are indicated by reference symbol 8c in FIG. 5.

A doughnut-shaped liner 9 made of nonwoven fabric and having a circular hole 9a for avoiding interference with a flange portion 7a of the center core 7 and a notch for avoiding interference with an inserted magnetic head is attached to the inner surface of the second cassette shell half 5 located on the upper side in the figures. The attachment pattern and method are similar to those of the liner 8.

The liners 8, 9 are moistened and thereby expanded just before being attached to the inner surfaces of the cassette shell halves 4, 5. The moistening is conducted by letting the liner material or the cut liners stand in an atmosphere of a humidity greater than the expected maximum humidity of the magnetic disk cartridge 1 use environment (e.g., in an atmosphere having a relative humidity of around 90%). The liners 8, 9 can be prepared by either of two processes. Specifically, as shown in FIG. 1, the liner material (stock) can first be moistened and expanded and then cut into liners 8, 9 of the prescribed size or, as shown in FIG. 2, the liners 8, 9 can first be cut from the liner material and then be moistened and expanded to the prescribed shape and size. When the later process is adopted, the liners are cut to sizes that are a few to several percent smaller than the prescribed sizes so that they will have the prescribed sizes after expansion due to moistening. In either process, the liners 8, 9 are attached to the inner surfaces of the cassette shell 3 in their moistened/expanded state, so that after drying they will remain tautly stretched over the inner surfaces of the cassette shell 3 at all times.

FIG. 6 is a sectional view similar to that of FIG. 4 showing an essential part of another magnetic disk cartridge to which the invention is applied.

The configuration of FIG. 6 is characterized in that portions of the inner surfaces of the cassette shell 3 other than those opposite the liners 8, 9 at their outer peripheral portions, their inner peripheral portions and the edges of their notches for enabling insertion of magnetic heads, i.e. other than the liner attachment regions on the inner surfaces of the cassette shell 3 (the regions indicated by reference symbol 8c in FIG. 5), are formed with recesses 10 which result in the cassette shell 3 having thin-wall portions 11. Since the configuration is identical to that of FIG. 4 in other respects, the components in FIG. 6 which are-the same as those in FIG. 4 are assigned the same reference symbols as those FIG. 4 and will not be explained further.

This thinning of the walls of the cassette shell 3 is advantageous in a magnetic disk cartridge 1 which, as shown in FIG. 3, is provided with a magnetic head access opening 3a in one side of its cassette shell 3, since the cassette shell 3 has to be thick enough to permit insertion of magnetic heads.

On the other hand, since the magnetic disk 2 rapidly rotated inside the cassette shell 3 is made of a flexible material, it has to be prevented from flopping during rotation and the space inside the cassette shell 3 has to be precisely formed to suitable dimensions (generally to a thickness equal to that of the magnetic disk and the liners 8, 9 plus some amount of clearance). The required size can be achieved with high precision only if the cassette shell 3 has sufficient rigidity. Owing to this and the fact that the inner surfaces of the conventional cassette shell 3 have to be smooth to enable the liners 8, 9 to be attached over the entire area of the inner surfaces, the cassette shell has required considerable thickness throughout.

The thickness of the cassette shell 3 therefore has to be made twice or more than that of the conventional 3.5-inch floppy disk having a thickness of about 3 mm. Accordingly, the wall thickness of the pair of cassette shell halves 4, 5 mated and joined to form the conventional cassette shell 3 have also required fairly large thickness.

However, a cassette shell 3 with such a thick-walled structure has the drawbacks of being heavy and high in production cost owing to the large amount of material and long molding time required. Moreover, deformations known as sink marks are liable to occur in the thick-wall portions and give rise to degraded dimensional precision and poor appearance. These are quality problems that cannot be ignored.

Figure 7:
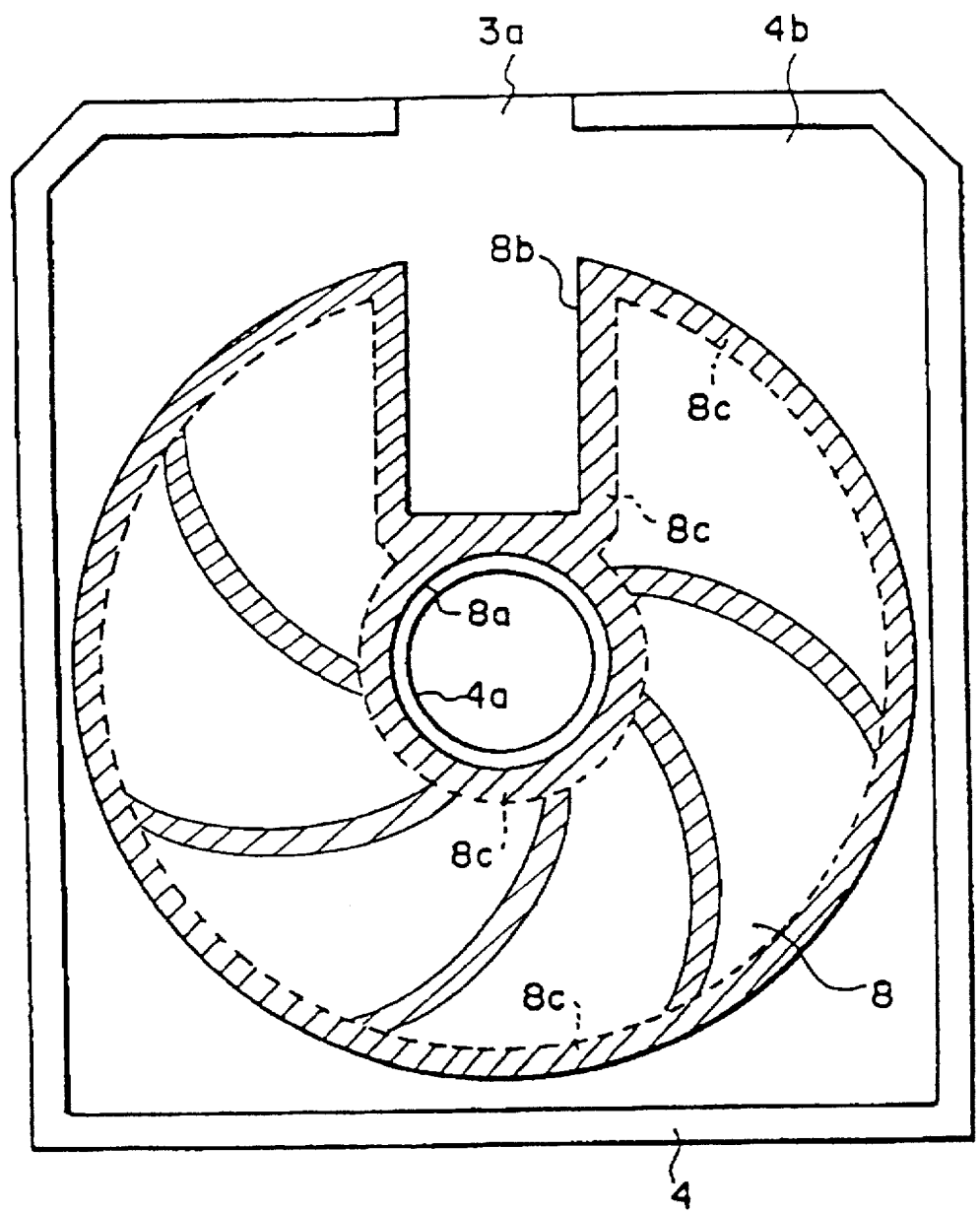
FIG. 7 is plan view of another cassette shell half with an attached liner.

These problems are overcome by the present invention. Specifically, in the present invention, the liners 8, 9 are attached to the inner surfaces of the cassette shell 3 in a moistened and expanded state and then dried. Since the liners shrink with drying, they remain tautly stretched irrespective of changes in the use environment even if not attached over the whole of the inner surfaces of the cassette shell 3. It is therefore possible to select from among various liner attachment region patterns, such as lattice, honeycomb, spoke, and pinwheel (see FIG. 7), and to thicken the walls of the cassette shell 3 in the form of ribs only at the portions corresponding to the selected pattern. The strength of the cassette shell 3 can be ensured by the thick attachment regions (ribs) even if the remaining regions of the cassette shell are thin walled.

The invention does not require any new or special technique for attaching the liners 8, 9 to the inner surfaces of the cassette shell 3. Any of various conventional methods suffice, including attachment by use of a bonding agent or other adhesive or by ultrasonic welding.

When the process for producing a magnetic disk cartridge according to this invention is employed, the liners attached to the inner surfaces of the cassette shell in a moistened and expanded state shrink upon drying and therefore stretch tautly across the cassette shell inner surfaces and do not sag even if later exposed to humid air. Since there is therefore no danger that excessive contact of the liners with the magnetic disk surfaces will cause a rise in torque during high-speed rotation of the magnetic disk, the magnetic disk can be stably rotated at high speed at all times. Moreover, since liner sag can be prevented even without attachment over the whole inner surfaces of the cassette shell, the invention enables a quantum improvement in productivity and a reduction in production cost.

What is claimed is:

1. A process for producing a magnetic disk cartridge comprising the steps of moistening at least one liner to be attached to an inner surface of a cassette shell to face a magnetic disk rotatably encased in the cassette shell, thereby expanding the liner, and attaching the moistened and expanded liner to the inner surface of the cassette shell.

2. A process for producing a magnetic disk cartridge as defined in claim 1, wherein the step of moistening the liner includes moistening liner material to expand the material and cutting the liner from the material.

3. A process for producing a magnetic disk cartridge as defined in claim 1, wherein the step of moistening of the liner includes cutting the liner from liner material and moistening the liner to expand it.

* * * * *